United States Patent
Ito et al.

(10) Patent No.: US 11,153,751 B2
(45) Date of Patent: Oct. 19, 2021

(54) COMMUNICATION SYSTEM, SUBSCRIBER-INFORMATION MANAGEMENT APPARATUS, INFORMATION ACQUISITION METHOD, NON-TRANSITORY COMPUTER-READABLE MEDIUM, AND COMMUNICATION TERMINAL

(71) Applicant: NEC Corporation, Tokyo (JP)

(72) Inventors: Hironori Ito, Tokyo (JP); Anand Raghawa Prasad, Tokyo (JP); Andreas Kunz, Heidelberg (DE); Naoaki Suzuki, Tokyo (JP); Toshiyuki Tamura, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 16/853,403

(22) Filed: Apr. 20, 2020

(65) Prior Publication Data

US 2020/0252798 A1 Aug. 6, 2020

Related U.S. Application Data

(63) Continuation of application No. 16/311,463, filed as application No. PCT/JP2017/025680 on Jul. 14, 2017, now abandoned.

(30) Foreign Application Priority Data

Jul. 15, 2016 (JP) .............................. JP2016-140760

(51) Int. Cl.
*H04W 12/04* (2021.01)
*H04W 12/06* (2021.01)
(Continued)

(52) U.S. Cl.
CPC ......... *H04W 12/0401* (2019.01); *H04L 63/20* (2013.01); *H04W 8/18* (2013.01);
(Continued)

(58) Field of Classification Search
CPC ......... H04W 12/06; H04W 8/24; H04W 8/18; H04W 12/04; H04W 92/24; H04W 88/12;
(Continued)

(56) References Cited

U.S. PATENT DOCUMENTS

2014/0171029 A1 6/2014 Holtmanns
2015/0139238 A1 5/2015 Pourzandi et al.
(Continued)

FOREIGN PATENT DOCUMENTS

JP 2019-096918 A 6/2019
KR 10-0904215 B1 6/2009
(Continued)

OTHER PUBLICATIONS

3GPP TR 23.799 V0.2.0 Study on Architecture for Next Generation System (Release 14) (Feb. 2016) (pp. 1-17).
(Continued)

*Primary Examiner* — Farid Seyedvosoghi
(74) *Attorney, Agent, or Firm* — Wilmer Cutler Pickering Hale and Dorr LLP

(57) ABSTRACT

A purpose of the present disclosure is to provide a communication system that are capable of maintaining a high security level in each divided network in the case of applying network slicing to a core network. A communication system according to the present disclosure includes a subscriber-information management apparatus (10) configured to manage subscriber information of a communication terminal; and a security apparatus (20) configured to manage identification information of the communication terminal in association with security information used in at least one
(Continued)

network slice system usable by the communication terminal. The subscriber-information management apparatus (10) acquires, using the identification information of the communication terminal and identification information of a network slice system used by the communication terminal, security information used in the network slice system used by the communication terminal from the security apparatus (20).

3 Claims, 12 Drawing Sheets

(51) Int. Cl.
| | |
|---|---|
| *H04W 92/24* | (2009.01) |
| *H04W 88/12* | (2009.01) |
| *H04W 8/18* | (2009.01) |
| *H04L 29/06* | (2006.01) |
| *H04W 8/24* | (2009.01) |
| *H04W 88/14* | (2009.01) |

(52) U.S. Cl.
CPC ............ *H04W 8/24* (2013.01); *H04W 12/04* (2013.01); *H04W 12/04031* (2019.01); *H04W 12/06* (2013.01); *H04W 88/12* (2013.01); *H04W 92/24* (2013.01); *H04W 88/14* (2013.01)

(58) Field of Classification Search
CPC ............ H04W 88/14; H04W 12/0401; H04W 12/04031; H04W 12/0403; H04L 63/20
USPC .......................................................... 455/411
See application file for complete search history.

(56) References Cited

U.S. PATENT DOCUMENTS

| | | | |
|---|---|---|---|
| 2015/0156093 A1* | 6/2015 | Li .......................... | H04W 24/04 714/37 |
| 2015/0304846 A1 | 10/2015 | Wallis | |
| 2016/0353465 A1* | 12/2016 | Vrzic ................. | H04W 28/0247 |
| 2016/0374044 A1* | 12/2016 | Li ............................ | H04L 67/04 |
| 2017/0164212 A1 | 6/2017 | Opsenica et al. | |
| 2019/0029075 A1* | 1/2019 | Wang ................. | H04W 12/0027 |
| 2019/0037409 A1* | 1/2019 | Wang ................... | H04W 28/06 |
| 2019/0159027 A1 | 5/2019 | Kuge et al. | |

FOREIGN PATENT DOCUMENTS

| | | |
|---|---|---|
| KR | 10-2012-0029122 A | 3/2012 |
| KR | 10-2015-0116092 A | 10/2015 |

OTHER PUBLICATIONS

3GPP TS 33.401 V13.2.0 3GPP System Architecture Evolution (SAE) Security architecture (Release 13) (Mar. 2016) (pp. 1-146).
Extended European Search Report issued in European Patent Application No. 17827734.9, dated Apr. 8, 2019, 16 pages.
International Search Report corresponding to PCT/JP2017/025680 dated Aug. 15, 2017 (5 pages).
LG Electronics Inc., Network Slice Selection considering Authentication and Authorization, 3GPP TSG-SA WG2 Meeting #116 S2-163395, Jul. 15, 2016 (pp. 1-6).
NEC "Solution: Shared and Dedicated Network Functions for Network Slicing", SA WG2 Temporary Document, SA WG2 Meeting #114, S2-161785, Apr. 11-15, 2016, Sophia Antipolis (revision of S2-16xxxx), pp. 1-3 (3 pages).
NEC, pCR to TR 33.899: Proposal of solution for key issue of network slicing security, 3GPP TSG-SA WG3 (Security) Meeting #84 S3-160953, Jul. 29, 2016 (3 pages).
NGMN Ltd., "LS in from NGMN on 5G Security 1-12 Recommendations", ETSI Draft; XP014272139, NFV(16)000192, May 2, 2016, pp. 1-12 (12 pages).
Samsung, NextGen Network Slice Architecture Update, 3GPP TSG-SA WG2 Meeting#115 S2-162351, May 27, 2016 (pp. 1-3).
Samsung, Updates of solution for key issue 12 on Authentication Framework—supporting multiple slices, 3GPP TSG-SA WG2 Meeting #116 S2-163524, Jul. 15, 2016 (pp. 1-3).
Korea Grant of Patent Notice of Allowance issued in Korean Patent Application No. 10-2019-7004154, dated Apr. 27, 2020, 8 pages.
Motorola Mobility, Lenovo, Broadcom "Solution: Simultaneous Access to Multiple Independent Network Slices," SA WG2 Temporary Document, SA WG2 Meeting #116, S2-163400, (revision of S2-162314), Jul. 11-15, 2016, Vienna, Austria, pp. 1-6.
Japanese Notice of Reasons for Refusal issued in Japanese Patent Application No. 2018-527677, dated Jun. 16, 2020, 6 pages.
Extended European Search Report issued in European Patent Application No. 20194811.4,dated Oct. 30, 2020, 17 pages.
ZTE (email discussion convener) "Summary of email discussion on Slicing WT1 (i.e. NS_WT_#1) assuming one UE—one slice and fully separated slices (i.e. a basic model)", SA WG2 Meeting #116, S2-163508 (revision of S2-16xxxx), Jul. 11-15, 2016, Vienna, AT, pp. 1-31.
Chinese Notification of Completion for Formalities of Registration for CN Application No. 201780044013.0 dated Aug. 11, 2021 with English Translation.

* cited by examiner

| IMSI | NSID | MASTER KEY K |
|------|------|--------------|
| 001  | 110  | Ka_001       |
|      | 120  | Kb_001       |
| 002  | 110  | Ka_002       |
|      | 130  | Kc_002       |

| AuC | NSID |
|---|---|
| AuC40 | 110, 120, 130 |
| AuC50 | 140, 150, 160 |

| IMSI | NSID | ACCESS RIGHT |
|------|------|--------------|
| 003  | 110  | VALID        |
|      | 120  | INVALID      |
|      | 130  | INVALID      |
| 004  | 140  | VALID        |
|      | 150  | VALID        |
|      | 160  | INVALID      |

Fig. 12

COMMUNICATION SYSTEM, SUBSCRIBER-INFORMATION MANAGEMENT APPARATUS, INFORMATION ACQUISITION METHOD, NON-TRANSITORY COMPUTER-READABLE MEDIUM, AND COMMUNICATION TERMINAL

CROSS-REFERENCE TO RELATED APPLICATIONS

This application is a continuation application of U.S. application Ser. No. 16/311,463 entitled "COMMUNICATION SYSTEM, SUBSCRIBER-INFORMATION MANAGEMENT APPARATUS, INFORMATION ACQUISITION METHOD, NON-TRANSITORY COMPUTER-READABLE MEDIUM, AND COMMUNICATION TERMINAL," filed on Dec. 19, 2018, which is the U.S. national stage application of International Application No. PCT/JP2017/025680 entitled "COMMUNICATION SYSTEM, SUBSCRIBER-INFORMATION MANAGEMENT APPARATUS, INFORMATION ACQUISITION METHOD, NON-TRANSITORY COMPUTER-READABLE MEDIUM, AND COMMUNICATION TERMINAL," filed on Jul. 14, 2017, which claims the benefit of the priority of Japanese Patent Application No. 2016-140760, filed on Jul. 15, 2016, the disclosures of each of which are hereby incorporated by reference in their entirety.

TECHNICAL FIELD

The present disclosure relates to a communication system, a subscriber-information management apparatus, an information acquisition method, and a program, and relates to, for example, a communication system, a subscriber-information management apparatus, an information acquisition method, and a program that perform security processing.

BACKGROUND ART

In recent years, internet-of-things (IoT) services have been studied. For IoT services, a large number of terminals that autonomously communicate without user operation (hereinafter, referred to as IoT terminals) are used. For this reason, in order for service providers to provide IoT services using a large number of IoT terminals, it is desired to efficiently accommodate a large number of IoT terminals in networks managed by network operators or the like.

Non Patent Literature 1 discloses, in Annex B, the configuration of a core network to which network slicing is applied. Network slicing is a technique for dividing a core network in order for each providing service to efficiently accommodate a large number of IoT terminals. Non Patent Literature 1 further discloses, in Section 5.1, that each divided network (network slice system) needs to be customized or optimized.

On the other hand, Non Patent Literature 2 discloses, in Section 6.2, the configuration of a key used for security processing in Evolved packet system (EPS). Specifically, a universal subscriber identity module (USIM) and an authentication center (AuC) each have a master key K. The USIM and the AuC each generate a confidentiality key (CK) and an integrity key (IK) with the master key K.

Then, a user equipment (UE) and a home subscriber server (HSS) each generate a key $K_{ASME}$ with the CK, the IK, and a serving network identity (SNID). An SNID is an ID for identifying a network operator. Then, the UE and a mobility management entity (MME) each generate, with the key $K_{ASME}$, a key used for security processing in a core network and a radio access network.

In EPS, security processing, such as encryption of messages and prevention of message tampering (assurance of message integrity), is performed with the keys generated in this manner.

CITATION LIST

Non Patent Literature

[Non Patent Literature 1] 3GPP TR23.799 V0.2.0 (2016-2) Annex B, 5.1 Key issue 1: Support of network slicing
[Non Patent Literature 2] 3GPP TS 33.401 V13.2.0 (2016-03) 6.2 EPS key hierarchy

SUMMARY OF INVENTION

Technical Problem

When the network slicing disclosed in Non Patent Literature 1 is applied, keys different in each network slice system can be used to enhance the independency of each network slice system and to improve the security. However, the configuration of the key disclosed in Non Patent Literature 2 shows that a UE uses one key $K_{ASME}$ in a core network. Thus, although the configuration of the key disclosed in Non Patent Literature 2 is used for a core network to which network slicing is applied, keys different in each network slice system cannot be generated. Accordingly, it is difficult to enhance the independency of each network slice system and to improve the security.

A purpose of the present disclosure is to provide a communication system, a subscriber-information management apparatus, an information acquisition method, and a program that are capable of maintaining a high security level in each divided network (network slice system) in the case of applying network slicing to a core network.

Solution to Problem

A communication system according to a first exemplary aspect of the present disclosure includes a subscriber-information management apparatus configured to manage subscriber information of a communication terminal; and a security apparatus configured to manage identification information of the communication terminal in association with security information used in at least one network slice system usable by the communication terminal, wherein the subscriber-information management apparatus acquires, using the identification information of the communication terminal and identification information of a network slice system used by the communication terminal, security information used in the network slice system used by the communication terminal from the security apparatus.

A subscriber-information management apparatus according to a second exemplary aspect of the present disclosure includes a communication means for communicating with a security apparatus that manages identification information of a communication terminal in association with security information used in at least one network slice system usable by the communication terminal; and a management means for managing identification information of the network slice system associated with the security apparatus, wherein the communication means acquires, using the identification information of the communication terminal and identification information of a network slice system used by the communication terminal, security information used in the network slice system used by the communication terminal from the security apparatus.

An information acquisition method according to a third exemplary aspect of the present disclosure includes managing a security apparatus that manages identification information of a communication terminal in association with security information used in at least one network slice system usable by the communication terminal, and identification information of the network slice system associated with the security apparatus; and acquiring, using the identification information of the communication terminal and identification information of a network slice system used by the communication terminal, security information used in the network slice system used by the communication terminal from the security apparatus.

A program for causing a computer to execute according to a fourth exemplary aspect of the present disclosure includes managing a security apparatus that manages identification information of a communication terminal in association with security information used in at least one network slice system usable by the communication terminal, and identification information of the network slice system associated with the security apparatus; and acquiring, using the identification information of the communication terminal and identification information of a network slice system used by the communication terminal, security information used in the network slice system used by the communication terminal from the security apparatus.

Advantageous Effects of Invention

According to the present disclosure, it is possible to provide a communication system, a subscriber-information management apparatus, an information acquisition method, and a program that are capable of maintaining a high security level in each divided network (network slice system) in the case of applying network slicing to a core network.

BRIEF DESCRIPTION OF DRAWINGS

FIG. 12 is a diagram showing information managed by the AuC according to the second embodiment.

DESCRIPTION OF EMBODIMENTS

First Embodiment

Figure 1:
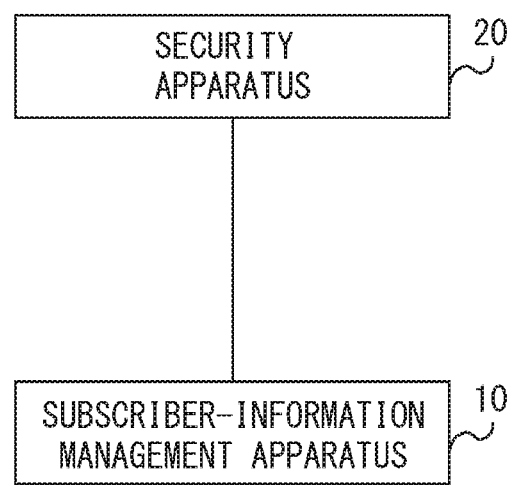
FIG. 1 is a diagram showing a configuration of a communication system according to a first embodiment.

Hereinafter, embodiments of the present disclosure are described with reference to the drawings. A communication system in FIG. 1 includes a subscriber-information management apparatus 10 and a security apparatus 20. The subscriber-information management apparatus 10 and the security apparatus 20 may be a computer apparatus that operates by a processor executing a program stored in a memory.

The subscriber-information management apparatus 10 manages subscriber information of at least one communication terminal. The communication terminal may be, for example, a mobile phone terminal, a smartphone terminal, a computer apparatus having a communication function, or the like. The communication terminal may be an IoT terminal, a machine-to-machine (M2M) terminal, a machine-type-communication (MTC) terminal, or the like.

The subscriber information may be, for example, contract information related to a user using the communication terminal, position information of the communication terminal, information for identifying the communication terminal, or the like.

The security apparatus 20 manages information for identifying the communication terminal (identification information of the communication terminal) in association with security information used in at least one network slice system usable by the communication terminal. The security information is unique information for each network slice system. The security information may be key information used to authenticate the communication terminal. The security information may be key information used to encrypt data or to perform integrity assurance processing, or the like. The security information may be a master key used to generate key information used for authentication or encryption. The security information may be a security algorithm used to perform security processing, or the like.

The subscriber-information management apparatus 10 acquires, using the identification information of the communication terminal and the identification information of a network slice system used by the communication terminal, security information used in the network slice system used by the communication terminal from the security apparatus 20.

As described above, the communication system in FIG. 1 enables the subscriber-information management apparatus 10 to acquire the security information used in the network slice system used by the communication terminal. This enables the subscriber-information management apparatus 10 to use different security information in each network slice system used by the communication terminal. As a result, it is possible to enhance the independency of each network slice system and to improve the security of the core network as a whole.

Second Embodiment

A configuration example of a communication system according to a second embodiment of the present disclosure is described with reference to FIG. 2. The communication system in FIG. 2 includes a core network 100, a 5G radio access network (RAN) 80, and a user equipment (UE) 90. The core network 100 may be, for example, a network defined in 3rd Generation Partnership Project (3GPP).

The term "UE" is used as a general term for communication terminals in 3GPP. Although one UE 90 is shown in FIG. 2, the communication system in FIG. 2 may include a plurality of UEs 90.

The 5G RAN 80 is a network that provides a radio channel to the UE 90. The 5G RAN 80 may include, for example, a base station, and further include a base-station control apparatus that controls the base station, or the like. The 5G RAN 80 is, for example, a next-generation RAN that achieves a low-delay and broadband radio frequency, or the like. The term "5G RAN" is used as a RAN used in a next generation, but the name of the RAN used in a next generation is not limited to "5G RAN".

A configuration example of the core network 100 is described. The core network 100 includes a home subscriber server (HSS) 30, an authentication center (AuC) 40, an AuC 50, an AuC 60, a control plane function (CPF) entity 70 (hereinafter, referred to as a CPF 70), a network slice (NS) system 110, an NS system 120, and an NS system 130. The AuCs may be in the same apparatus as the HSS 30, and some functions of the AuCs may be implemented in the HSS 30. Alternatively, the each AuC may be in each NS system.

The HSS 30 is equivalent to the subscriber-information management apparatus 10 in FIG. 1. The HSS 30 manages subscriber information of the UE 90. The HSS 30 may be replaced with a home location register (HLR). The HSS 30 has a key management function. The HSS 30 transmits key information to each NS system. The key management function is for managing which node apparatus or which NS system the key information of a UE has been transmitted to. The key management function is for managing the type or the like of the key information transmitted to a node apparatus or an NS system. The HSS 30 may have a part of the key management function, and an apparatus different from the HSS 30 may have the other function. Alternatively, an apparatus different from the HSS 30 may have all the function of the key management function.

The AuC 40, the AuC 50, and the AuC 60 (hereinafter, referred to as the AuC 40 and the like) each are equivalent to the security apparatus 20 in FIG. 1. The AuC 40 and the like each manage key information used for security processing for the UE 90. The AuC 40 and the like each further manage a parameter related to the security processing for the UE 90. The parameter related to the security processing is, for example, a parameter used for integrity assurance processing, confidentiality processing, or encryption processing in a non-access stratum (NAS). The NAS is a layer used for communication between the UE 90 or the like and the core network 100. The parameter related to the security processing may be a parameter used for integrity assurance processing, confidentiality processing, or encryption processing in an access stratum (AS). The AS is a layer used for communication between the 5G RAN 80 and the UE 90.

The parameter related to the security processing may be a parameter defining the length of a key. The length of a key is represented by, for example, the number of bits. The parameter related to the security processing may be a parameter indicating an encryption algorithm, a key generation algorithm, authentication algorithm, or the like.

The CPF 70 is an apparatus that processes C-Plane data related to the UE 90 in the core network 100. The C-Plane data may be referred to as control data. The CPF 70 is an apparatus that processes control data, and may be referred to as a control apparatus. In addition, the CPF 70 may have a function equivalent to a mobility management entity (MME) defined in 3GPP.

The NS system 110 is a communication system used to provide a service different from those of the NS system 120 and the NS system 130. The NS system 120 is a communication system used to provide a service different from that of the NS system 130. The service provided by each NS system may be, for example, an automatic driving service, a service related to a smart meter, a vending-machine management service, or the like. The services provided by the NS systems are not limited to these services, and various services are provided.

Figure 2:
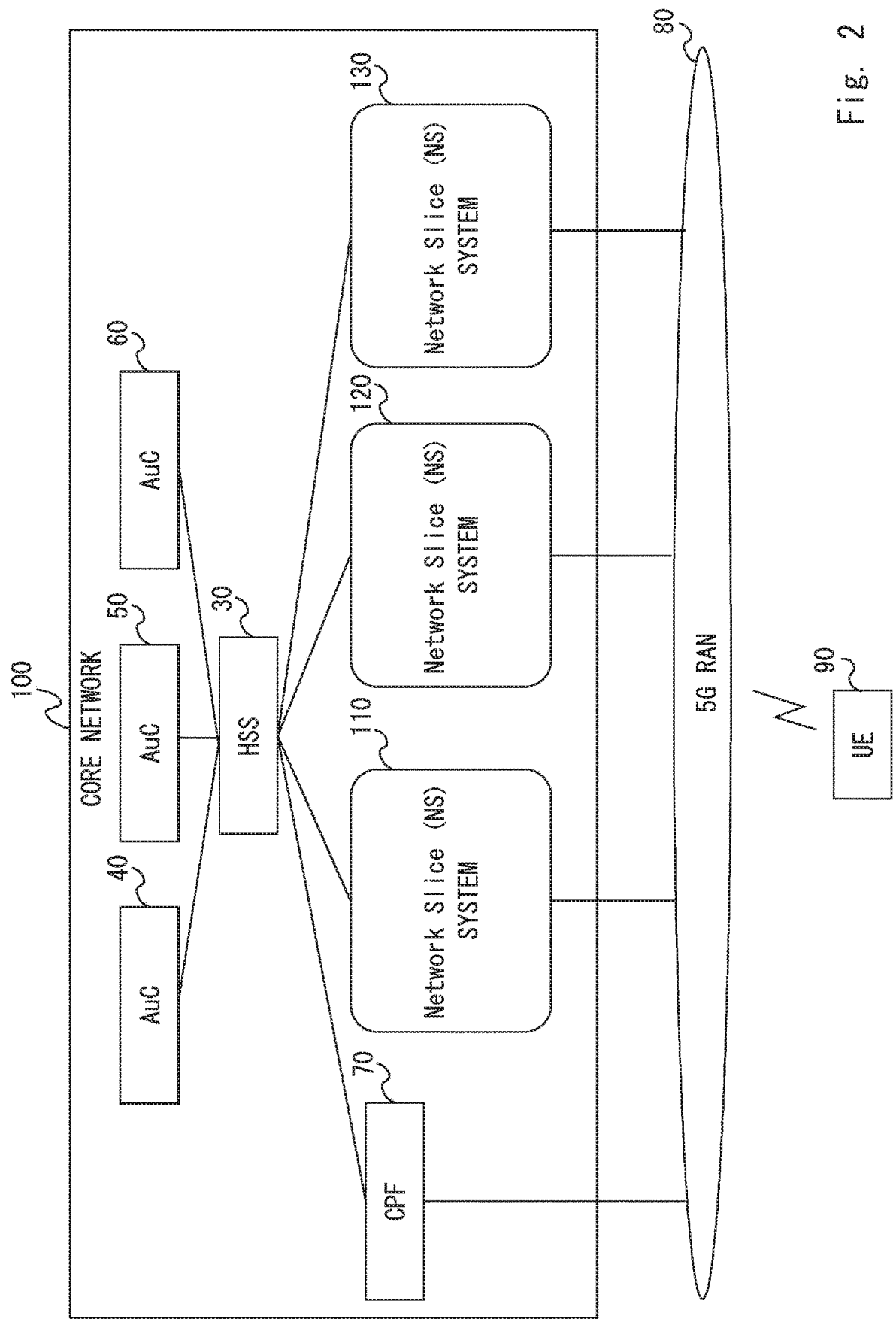
FIG. 2 is a diagram showing a configuration of a communication system according to a second embodiment.

FIG. 2 shows that the CPF 70 is disposed in the core network 100 and does not belong to any of the NS system 110, the NS system 120, and the NS system 130. However, the CPF 70 may belong to any one of the NS system 110, the NS system 120, and the NS system 130, or may be included in each of the NS system 110, the NS system 120, and the NS system 130.

Figure 3:
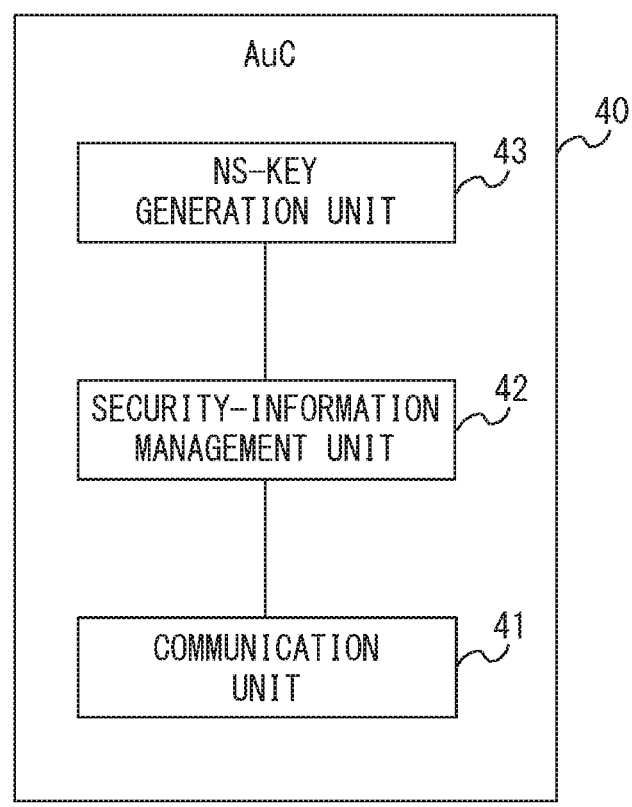
FIG. 3 is a diagram showing a configuration of an AuC according to the second embodiment.

Next, a configuration example of the AuC 40 according to the second embodiment of the present disclosure is described with reference to FIG. 3. The AuC 50 and the AuC 60 each have a configuration similar to that of the AuC 40. The AuC 40 includes a communication unit 41, a security-information management unit 42, and an NS-key generation unit 43. The communication unit 41 may be a transmitter and a receiver.

The communication unit 41, the security-information management unit 42, and the NS-key generation unit 43 may be software or a module that performs processing by a processor executing a program stored in a memory. The communication unit 41, the security-information management unit 42, and the NS-key generation unit 43 may be hardware such as a circuit or a chip.

The communication unit 41 transmits data mainly to the HSS 30.

The security-information management unit 42 manages the security information associated with each UE 90. Here, the information managed by the security-information management unit 42 is described with reference to FIG. 4. The security-information management unit 42 manages an international mobile subscriber identity (IMSI), a network slice identity (NSID), and a master key K in association with each other. The IMSI is identification information used to identify the UE 90. The NSID is identification information used to identify the NS system.

Figures 4, 5:
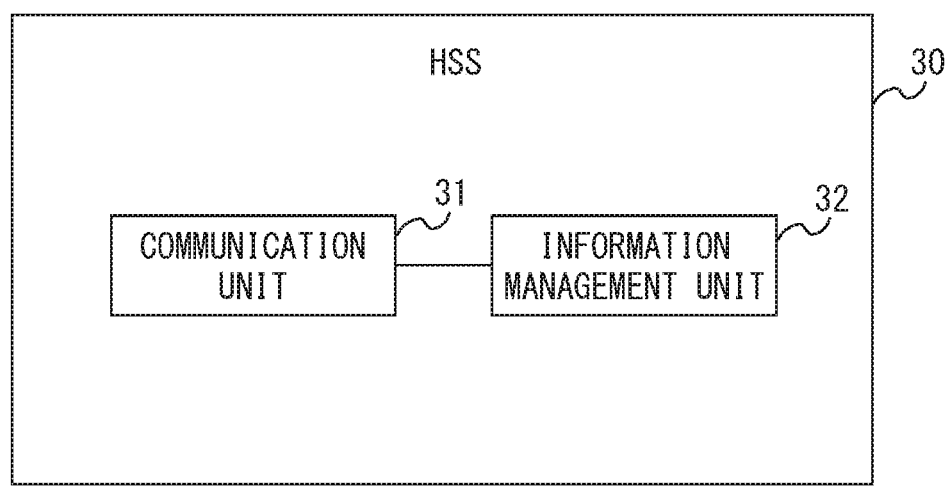
FIG. 4 is a diagram showing information managed by the AuC according to the second embodiment.
FIG. 5 is a diagram showing a configuration of an HSS according to the second embodiment.

FIG. 4 shows that the UE, the IMSI of which is 001, can use the NS system 110 and the NS system 120. FIG. 4 further shows that a master key Ka_001 used for the security processing in the NS system 110 and a master key Kb_001 used for the security processing in the NS system 120 are assigned to the UE, the IMSI of which is 001. With the UE, the IMSI of which is 002, usable NS systems and master keys K used for the security processing in the NS systems are associated.

Although FIG. 4 shows that the security-information management unit 42 manages master keys related to a plurality of NS systems, the security-information management unit 42 may manage a master key related to one NS system. For example, the AuC 40 may be used as an apparatus that manages the master key K related to the NS system 110. In this case, the security-information management unit 42 may not manage information related to the NSID, and may manage the IMSI and the master key K in association with each other.

Returning to FIG. 3, the NS-key generation unit 43 generates a service key Ksv used in each NS system with the master key K. For example, the NS-key generation unit 43 generates, with the master key Ka_001, a service key Ksv-A used in the NS system 110 by the UE, the IMSI of which is 001. The NS-key generation unit 43 further generates, with the master key Kb_001, a service key Ksv-B used in the NS system 120 by the UE, the IMSI of which is 001. Similarly, the NS-key generation unit 43 generates a service key Ksv used by the UE, the IMSI of which is 002.

A configuration example of the HSS 30 according to the second embodiment of the present disclosure is described with reference to FIG. 5. The HSS 30 includes a communication unit 31 and an information management unit 32. The communication unit 31 and the information management unit 32 may be software or a module that performs processing by a processor executing a program stored in a memory. Alternatively, the communication unit 31 and the information management unit 32 may be hardware such as a circuit or a chip. The communication unit 31 may be a transmitter and a receiver.

The communication unit 31 transmits data to the AuC 40, the AuC 50, and the AuC 60. The communication unit 31 further transmits data to a node apparatus constituting the NS system 110, a node apparatus constituting the NS system 120, and a node apparatus constituting the NS system 130.

Figures 6, 7:
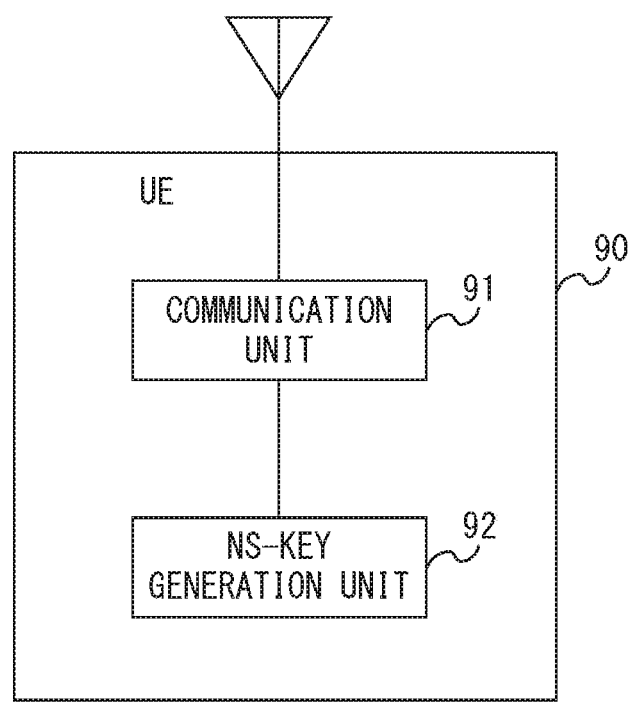
FIG. 6 is a diagram showing information managed by the HSS according to the second embodiment.
FIG. 7 is a diagram showing a configuration of a UE according to the second embodiment.

The information management unit 32 manages information in which the AuC 40 and the like are associated with the NS systems. Here, the information managed by the information management unit 32 is described with reference to FIG. 6. FIG. 6 shows that the AuC 40 is associated with the NS system 110 to the NS system 130, and that the AuC 50 is associated with NS system 140 to NS system 160. The association of the AuC 40 with the NS system 110 to the NS system 130 means that the AuC 40 manages the master key K used by each UE for the security processing in the NS system 110 to the NS system 130.

A configuration example of the UE 90 according to the second embodiment of the present disclosure is described with reference to FIG. 7. The UE 90 includes a communication unit 91 and an NS-key generation unit 92. The communication unit 91 and the NS-key generation unit 92 may be software or a module that performs processing by a processor executing a program stored in a memory. Alternatively, the communication unit 91 and the NS-key generation unit 92 may be hardware such as a circuit or a chip. The communication unit 91 may be a transmitter and a receiver.

The communication unit 91 transmits data mainly to a base station constituting the 5G RAN 80, or the like.

The NS-key generation unit 92 generates, with the master key K, a service key Ksv used in each NS system. For example, it is assumed that the NS-key generation unit 92 can use the NS system 110 and the NS system 120. In this case, the NS-key generation unit 92 generates a service key Ksv-A used in the NS system 110 with the master key Ka_001, and generates a service key Ksv-B used in the NS system 120 with the master key Kb_001.

For example, the communication unit 91 may include a plurality of SIMs, and manage a different master key K for each SIM. In addition, each SIM may be associated with any one of the NS systems.

A procedure of Attach processing related to the UE 90 according to the second embodiment of the present disclosure is described with reference to FIG. 8.

First, the UE 90 starts processing for connecting to the 5G RAN 80 (S11). For example, the UE 90 connects to a base station via a radio communication channel to communicate with a base station disposed in the 5G RAN 80.

Then, the UE 90 transmits an Attach request message to the CPF 70 via the 5G RAN 80 (S12). The UE 90 uses a service provided by, for example, the NS system 110. In this case, the UE 90 transmits an Attach request message, in which the IMSI of the UE 90 and the NSID indicating the NS system 110 are set, to the CPF 70. The UE 90 may set a plurality of NSIDs.

Then, authentication-and-key-agreement (AKA) processing is performed among the UE 90, the CPF 70, the HSS 30, and the AuC 40 (S13). By performing the AKA processing in step S13, it is possible for the UE 90 and the HSS 30 to confirm that the service key Ksv-A generated by the UE 90 matches the service key Ksv-A generated by the AuC 40. When the UE 90 has set a plurality of NSIDs in the Attach request message, a service key Ksv is generated for each NS system. In this case, it is confirmed that the service key Ksv generated for each NS system by the UE 90 matches the service key Ksv generated for each NS system by the AuC 40 in the AKA processing in step S13. The service key Ksv may be authenticated by performing processing other than the AKA processing among the UE 90, the CPF 70, the HSS 30, and the AuC 40.

After the AKA processing in step S13 is performed, the UE 90 can use, with the service key Ksv-A, the service provided by the NS system 110. For example, when the UE 90 accesses an apparatus included in the NS system 110, the UE 90 may transmit password information input by a user operating the UE 90 or the like to the apparatus included in the NS system 110. The apparatus included in the NS system 110 may provide the service to the UE 90 when the correctness of the transmitted password is confirmed.

Alternatively, the apparatus included in the NS system 110 may hold the service key Ksv-A related to the UE 90 in advance. For example, the apparatus included in the NS system 110 may acquire the service key Ksv-A from the HSS 30 or the AuC 40. The apparatus included in the NS system 110 may perform the AKA processing and provide the service to the UE 90 when the service key Ksv-A held by the apparatus itself matches the service key Ksv-A held by the UE 90.

Figure 8:
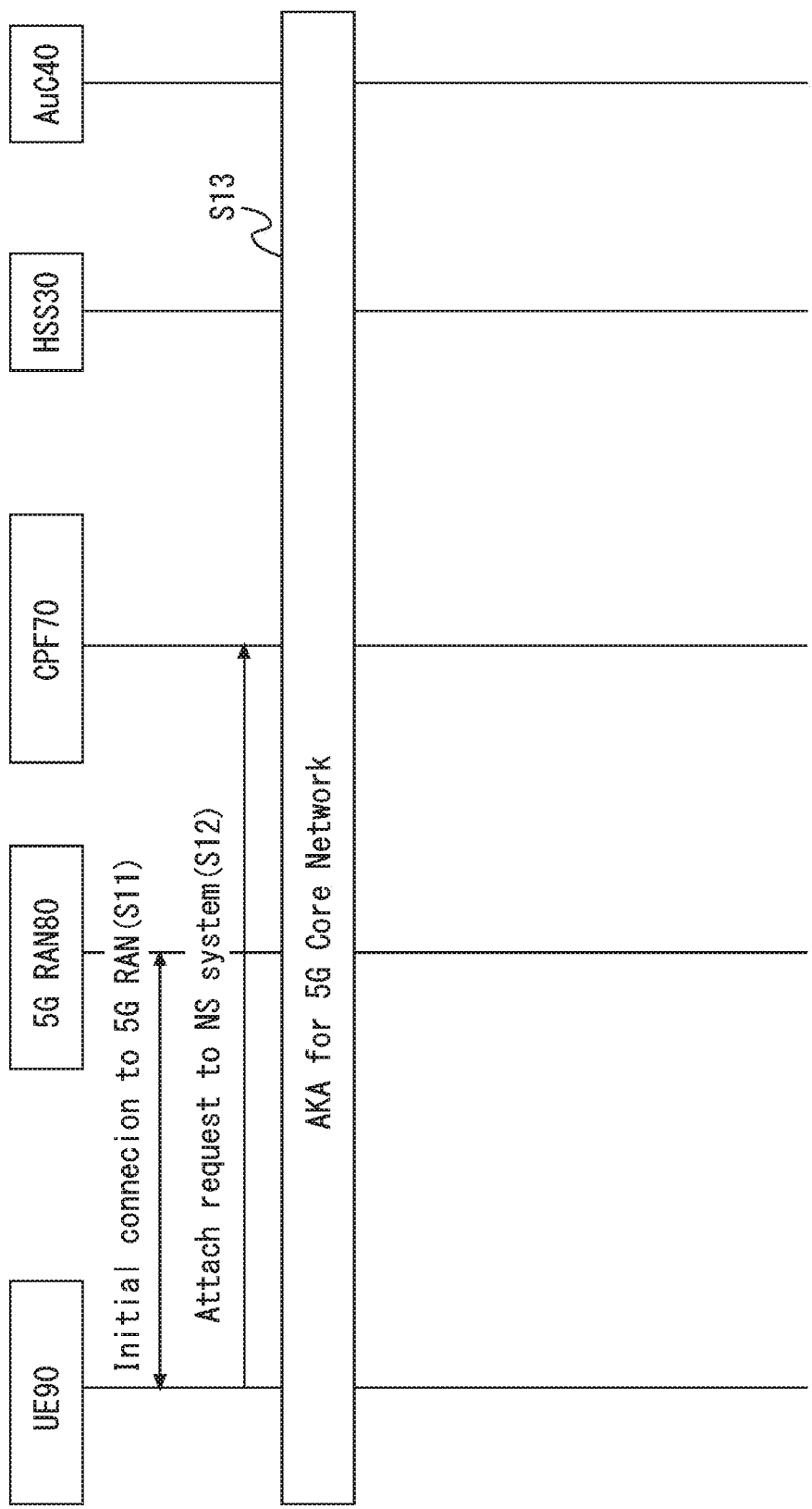
FIG. 8 is a diagram showing a procedure of Attach processing according to the second embodiment.

FIG. 8 shows that the UE 90 transmits an Attach request message, in which the IMSI of the UE 90 and the NSID indicating the NS system 110 are set, to the CPF 70 in step S12. On the other hand, when the number of NS systems usable by the UE 90 is one, and the NS system usable by the UE 90 is managed by the HSS 30 as the subscriber information, the UE 90 may transmit an Attach request message, in which the IMSI alone is set, to the CPF 70. When the number of NS systems usable by the UE 90 is more than one, the UE 90 transmits an Attach request message, in which the IMSI and the identification information of the NS systems to be used are set, to the CPF 70.

Figure 9:
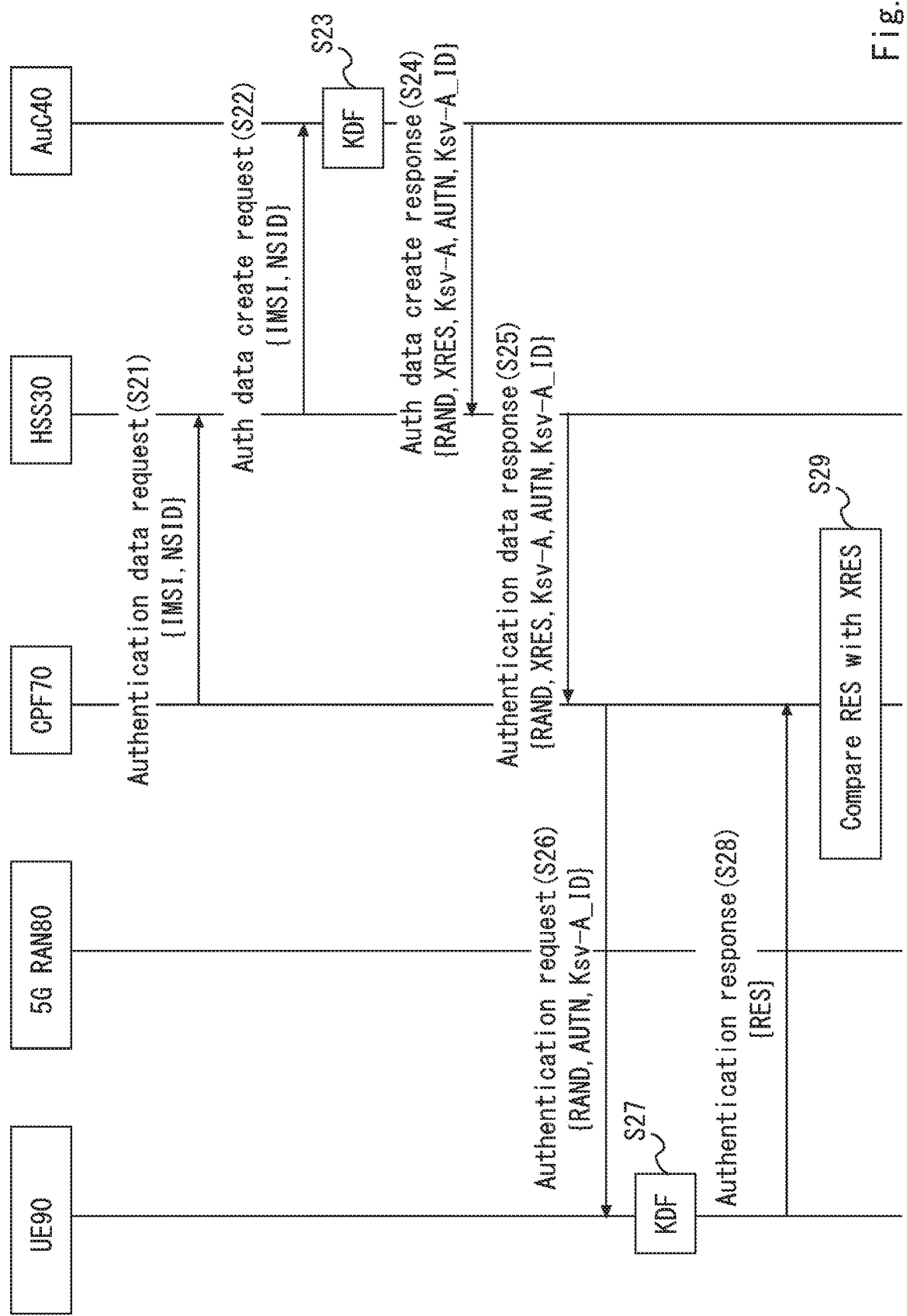
FIG. 9 is a diagram showing a procedure of AKA processing according to the second embodiment.

The AKA processing in step S13 in FIG. 8 is described in detail with reference to FIG. 9. First, the CPF 70 transmits an Authentication data request message to the HSS 30 (S21). The Authentication data request message contains the international mobile subscriber identity (IMSI) of the UE 90 and the NSID indicating a NS system that the UE 90 desires to use. The NSID is, for example, the identification information indicating the NS system 110.

Then, the HSS 30 transmits an Auth data create request message to the AuC 40 (S22). The Auth data create request message contains the IMSI of the UE 90 and the NSID indicating the NS system that the UE 90 desires to use. It is assumed that the NSID is the identification information indicating the NS system 110 in FIG. 9. The HSS 30 can identify, using the information shown in FIG. 6, the AuC associated with the NSID specified by the UE 90. Here, the HSS 30 has received the NSID indicating the NS system 110. Thus, the HSS 30 can identify, using the information shown in FIG. 6, the transmission destination of the Auth data create request message as the AuC 40. When the UE 90 does not specify the NSID, the HSS 30 identifies the AuC associated with a default NS system determined in advance. The default NS system may be determined for each UE in advance, or may be determined in accordance with the priority managed by the HSS 30. The priority may be determined for each UE.

It is assumed that the number of NS systems usable by the UE 90 is one, and that the HSS 30 manages the information associating the IMSI of the UE 90 with the NS system usable by the UE 90 as the subscriber information. In this case, the HSS 30 can identify, with the IMSI transmitted from the CPF 70, the NS system usable by the UE 90. The HSS 30 manages a plurality of NSIDs connectable by the UE 90 as subscriber data in some cases. In such a case, the HSS 30 may repeatedly transmit Auth data create request messages to the AuC 40 and the like corresponding to all the NSIDs indicated by the subscriber data.

Then, the AuC 40 derives the service key Ksv-A with a key derivation function (KDF) (S23). Here, the processing of the NS-key generation unit 43 of the AuC 40 for deriving a service key Ksv with the KDF is described with reference to FIG. 10.

Figure 10:
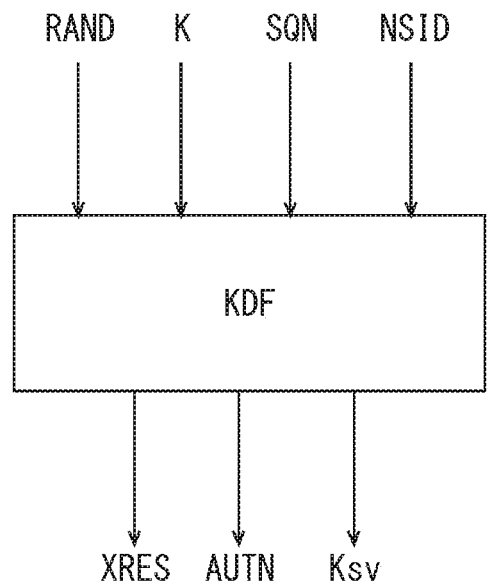
FIG. 10 is a diagram explaining derivation of a service key by the AuC according to the second embodiment.

FIG. 10 shows that an expected response (XRES), an authentication token (AUTN), and a service key Ksv are output as a result of input of the master key K, the NSID, a random number (RAND), and a sequence number (SQN) to the KDF. The KDF is, for example, a derivation function such as HMAC-SHA-25. Here, the master key K input to the KDF is assumed to be a service key Ka associated with the NS system 110. The service key Ksv output from the KDF is assumed to be the service key Ksv-A used in the NS system 110.

Returning to FIG. 9, the AuC 40 transmits an Auth data create response message to the HSS 30 (S24). The Auth data create response message contains a RAND, an XRES, a Ksv-A, a Ksv-A_ID, and an AUTN. The RAND contained in an Authentication data response message is the same as the RAND used as the input parameter when the Ksv-A and the like are generated in step S23. The XRES, the Ksv-A, and the AUTN are the same as the XRES, the Ksv-A, and the AUTN generated in step S23. The Ksv-A_ID is identification information identifying the Ksv-A. When the HSS 30 repeatedly transmits the Auth data create request messages to a plurality of AuCs, the HSS 30 confirms that all the AuCs return the respective corresponding Auth data create response messages, and, then, sets the RAND, the XRES, the Ksv-A, the Ksv-A_ID, and the AUTN contained in each Auth data create response message in an Authentication data response message for each corresponding NSID.

Then, the HSS 30 transmits an Authentication data response message to the CPF 70 (S25). The Authentication data response message contains the RAND, the XRES, the Ksv-A, the Ksv-A_ID, and the AUTN contained in the Auth data create response message transmitted in step S24. The RAND, the XRES, the Ksv-A, the Ksv-A_ID, and the AUTN are set for each NSID in some cases.

Then, the CPF 70 transmits an Authentication request message to the UE 90 via a 5G RAN 42 (S26). The Authentication request message contains a RAND, an AUTN, and a Ksv-A_ID. The RAND, the AUTN, and the Ksv-A_ID are the RAND, the AUTN, and the Ksv-A_ID received from the HSS 30 in step S25. When the UE 90 has set a plurality of NSIDs in the Attach request message (S12), the RAND, the AUTN, and the Ksv-A_ID are set for each NSID.

Then, the UE 90 derives the service key Ksv-A with the KDF (S27). Here, the processing of the NS-key generation unit 92 of the UE 90 for deriving the service key Ksv with the KDF is described with reference to FIG. 11.

Figure 11:
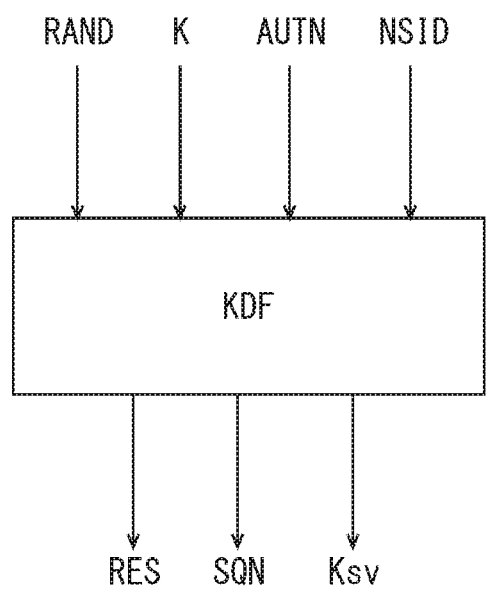
FIG. 11 is a diagram explaining derivation of a service key by the UE according to the second embodiment.

FIG. 11 shows that a response (RES), an SQN, and a service key Ksv are output as a result of input of the master key K, the NSID, the RAND, and the AUTN to the KDF. The KDF is, for example, a derivation function such as HMAC-SHA-256. Here, the master key K input to the KDF is assumed to be the service key Ka associated with the NS system 110. The service key Ksv output from the KDF is assumed to be the service key Ksv-A used in the NS system 110. Note that, it is assumed that an NS system accessible by the UE 90 is determined in advance, and that the UE 90 holds the NSID of the NS system in advance.

Returning to FIG. 9, the UE 90 transmits an Authentication response message to the CPF 70 via the 5G RAN 80 (S28). The Authentication response message contains an RES. The RES contained in the Authentication response message is the same as the RES generated in step S27. When a plurality of NSIDs has been set in the Authentication request message (S26), the RES is set for each NSID.

Then, the CPF 70 compares the XRES contained in the Authentication data response message received in step S25 with the RES contained in the Authentication response message received in step S28 (S29). When the RES matches the XRES in step S29, the CPF 70 can determine that the Ksv-A generated by the AuC 40 matches the Ksv-A generated by the UE 90. When a plurality of NSIDs is handled, the CPF 70 compares, for each NSID, the RES with the XRES. When the RES has matched the XRES, the CPF 70 notifies the HSS 30 that the RES has matched the XRES, or that the authentication for the Ksv-A has succeeded. The HSS 30 further transmits the Ksv-A_ID and the Ksv-A to the NS system 110.

Next, the case in which an error occurs in the AKA processing related to the UE 90 is described. For example, when the UE 90 cannot use the NSID set in an Auth data create request, the AuC 40 transmits, to the HSS 30, an Auth data create error message containing a cause value "No subscription to Network slice" as a response message corresponding to the Auth data create request message. The HSS 30 transmits, to the CPF 70, an Authentication data reject message containing the cause value "No subscription to Network slice". In addition, the CPF 70 transmits, to the UE 90, an Authentication failure message containing a cause value "Access to Network slice not allowed". In this case, the UE 90 records the fact that the NSID set in the Attach request message (S12) is not provided in an operator network. Furthermore, the UE 90 may set another NSID, and perform the ATTACH procedure for the same operator network in this case.

When the authentication in step S29 has failed, the CPF 70 transmits, to the UE 90, an Authentication failure message containing a cause value "Network Slice Authentication failed". In this case, the UE 90 records the fact that the NSID set in the Attach request message (S12) is not provided in an operator network. Furthermore, the UE 90 may set another NSID and perform the ATTACH procedure for the same operator network in this case.

In addition, the operation when the authentication for some NSIDs has succeeded although the authentication for a plurality of NSIDs has been performed is descried. In this case, the CPF 70 regards that the authentication has failed, and notifies and urges the UE 90 to perform re-ATTACH, or allows the authorized NSIDs to perform connection. The operation for each case is as follows.

The case in which the CPF 70 regards that the authentication has failed, and notifies and urges the UE 90 to perform re-ATTACH:

The CPF 70 transmits, to the UE 90, an Authentication failure message containing a cause value "Network Slice Authentication failed". In this case, the CPF 70 may set, in the Authentication failure message, an "Authentication status list" indicating the authentication result state of each NSID. In this case, the UE 90 may set the partially authorized NSIDs and perform the ATTACH procedure for the same operator network.

The case in which the CPF 70 allows the authorized NSIDs to perform connection:

The CPF 70 may regard that the authorization has partially succeeded and transmit, to the UE 90, an Authentication response message containing a cause value "Network Slice Authentication partially failed". In this case, the CPF 70 may set, in the Authentication response message, an "Authentication status list" indicating the authentication result state of each NSID. In this case, the UE 90 recognizes that the authentication for the partially authenticated NSIDs has succeeded. In this case, the UE 90 may use the services provided by the partially authenticated Network Slices.

Next, the operation when the authorization for the NSID set by the UE 90 in the Attach request message (S12) has succeeded is described. The CPF 70 may notify the network slice system shown in FIG. 2 of the authorized service key Ksv. In addition, the network slice system may further generate, with the service key Ksv, a necessary service key. The network slice system shown in FIG. 2 may further perform authentication operation in cooperation with the HSS 30.

Furthermore, the HSS 30 may manage the IMSI of the UE 90 in association with the NSID usable by the UE 90. In this case, the HSS 30 receives an Authentication data request message in step S21. When the UE 90 cannot use the NSID set in the Authentication data request message, the HSS 30 transmits an error message as a response message corresponding to the Authentication data request message. The HSS 30 can request each AuC of association data. When updating the association data, each AuC can transmit the updated data to the HSS 30. For example, each AuC may manage the IMSI, the NSID, and the access right in association with each other as shown in FIG. 12. The association data is, for example, data in which the IMSI, the NSID, and the access right are associated with each other as shown in FIG. 12. FIG. 12 shows that the UE, the IMSI of which is 003, can access the NS system 110, but cannot access the NS system 120 and the NS system 130. FIG. 12 further shows that the UE, the IMSI of which is 004, can access the NS system 140 and the NS system 150, but cannot access the NS system 160. When updating the data shown in FIG. 12, each AuC transmits the updated data to the HSS 30.

Third Embodiment

Figure 13:
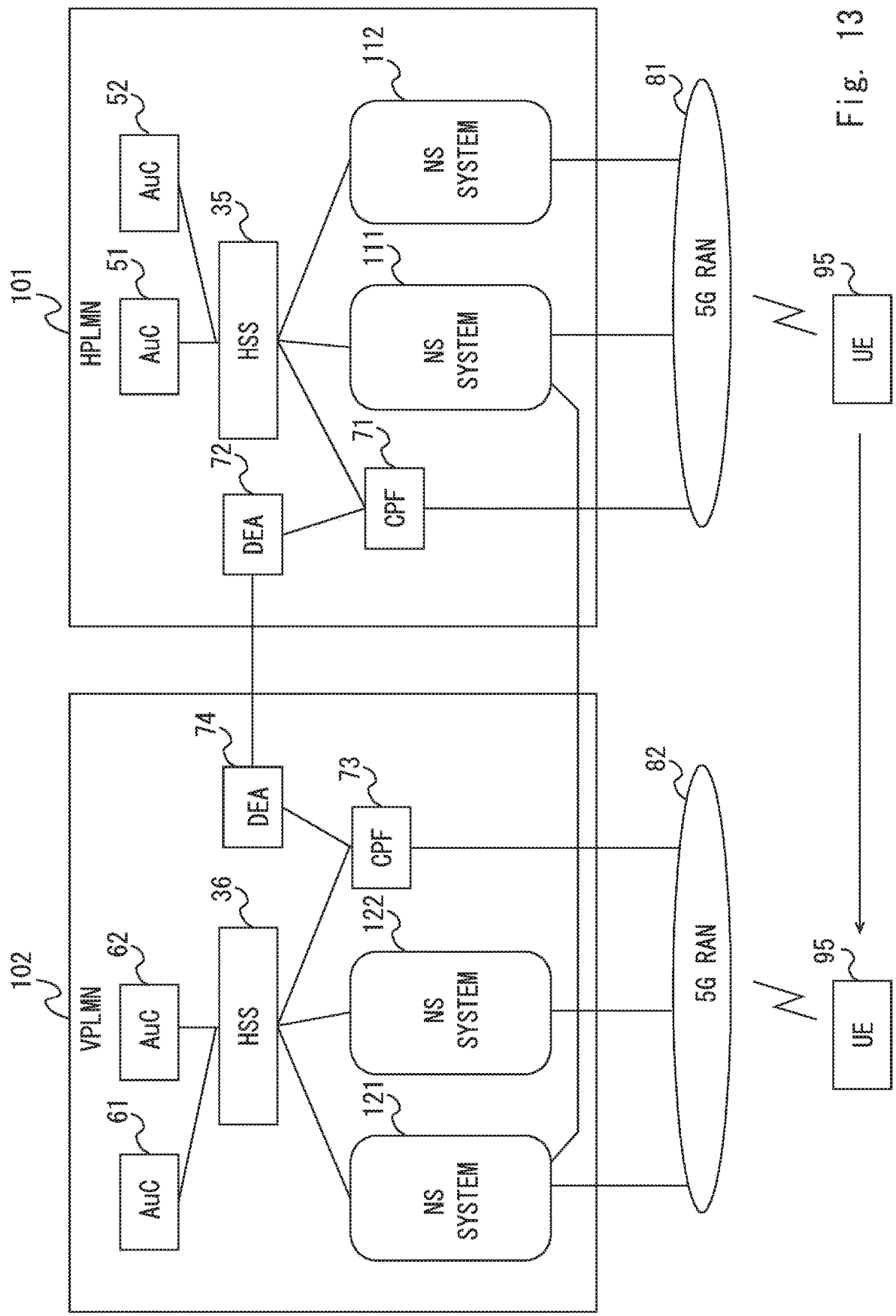
FIG. 13 is a diagram showing a configuration of a communication system according to a third embodiment.

Next, a configuration example of a communication system according to a third embodiment of the present disclosure is described with reference to FIG. 13. FIG. 13 shows that a UE 95 moves from a home public land mobile network (HPLMN) 101, which is a home network, to a visited public land mobile network (VPLMN) 102. In other words, FIG. 13 shows that the UE 95 roams from the HPLMN 101 to the VPLMN 102.

The HPLMN 101 includes an HSS 35, an AuC 51, an AuC 52, a CPF 71, a diameter edge agent (DEA) 72, an NS system 111, and an NS system 112. The UE 95 communicates with the HPLMN 101 via a 5G RAN 81. The VPLMN 102 includes an HSS 36, an AuC 61, an AuC 62, a CPF 73, a DEA 74, an NS system 121, and an NS system 122. The UE 95 communicates with the VPLMN 102 via a 5G RAN 82. The DEA 72 and the DEA 74 are apparatuses that relay a Diameter signal. The configurations except for the DEA 72 and the DEA 74 are similar to that of the communication network shown in FIG. 2.

When the UE 95 moves from the HPLMN 101 to the VPLMN 102, Attach processing is performed in the VPLMN 102. In this case, the UE 95 connects to the CPF 73 via the 5G RAN 82 similarly to the Attach processing described in steps S11 and S12 in FIG. 8.

Then, the CPF 73 determines, as a result of the inquiry to the HSS 36 in step S13 in FIG. 8, that the UE 95 is a roaming terminal that uses the HPLMN 101 as the home network. Thus, the CPF 73 connects to the CPF 71 via the DEA 74 and the DEA 72. The UE 95 performs the AKA processing with the CPF 71 via the CPF 73, the DEA 74, and the DEA 72. It is assumed that the UE 95 desires to use, for example, a service provided by the NS system 111 in the HPLMN 101. In this case, the UE 95 may perform the AKA processing with the CPF 71, and communicate with the NS system 111 via, for example, the NS system 121 after the authentication has been completed.

The VPLMN 102 may determine the NS system 121 as an NS system usable by the roaming terminal in advance. Alternatively, an NS system in the VPLMN 102 corresponding to the NS system 111 in the HPLMN 101 and an NS system in the VPLMN 102 corresponding to the NS system 112 in the HPLMN 101 are determined in advance. For example, the NS system 111 in the HPLMN 101 may be associated with the NS system 121 in the VPLMN 102, and the NS system 112 in the HPLMN 101 may be associated with the NS system 122 in the VPLMN 102.

As described above, although the UE 95 roams from the HPLMN 101 to the VPLMN 102, it is possible for UE 95 to access an NS system in the HPLMN 101 via the VPLMN 102.

Configuration examples of the UE 90, the AuCs 40 to 60 and the HSS 30 described in the plurality of embodiments above are described hereinafter.

Figure 14:
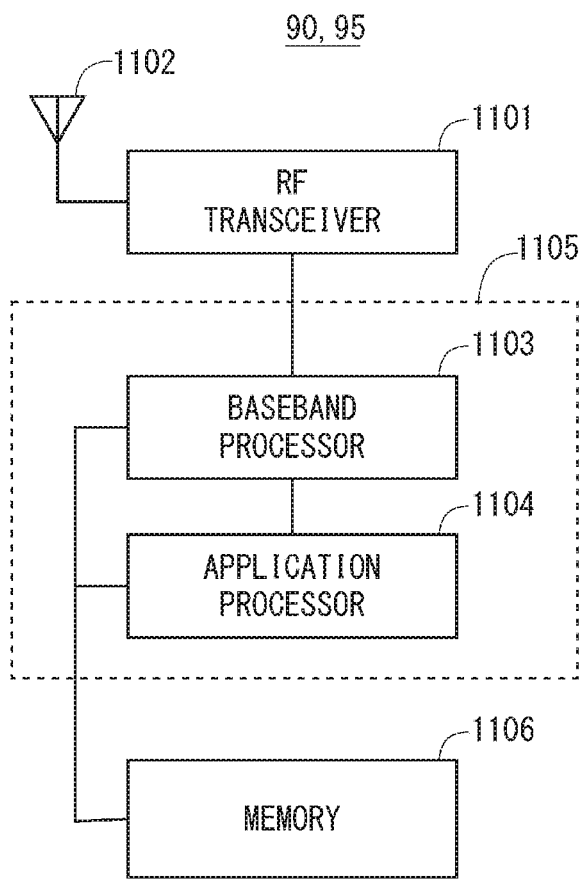
FIG. 14 is a diagram showing a configuration of the UE according to each embodiment.

FIG. 14 is a block diagram showing a configuration example of the UE90 and UE 95. A Radio Frequency (RF) transceiver 1101 performs analog RF signal processing for communication with the 5G RANs 80, 81, and 82. The analog RF signal processing performed by the RF transceiver 1101 includes frequency up-conversion, frequency down-conversion, and amplification. The RF transceiver 1101 is connected to an antenna 1102 and a baseband processor 1103. Specifically, the RF transceiver 1101 receives modulated symbol data (or OFDM symbol data) from the baseband processor 1103, generates a transmission RF signal and supplies the transmission RF signal to the antenna 1102. Further, the RF transceiver 1101 generates a baseband received signal based on a received RF signal received by the antenna 1102 and supplies it to the baseband processor 1103.

The baseband processor 1103 performs digital baseband signal processing (data plane processing) and control plane processing for radio communications. The digital baseband signal processing includes (a) data compression/decompression, (b) data segmentation/concatenation, (c) transmission format (transmission frame) composition/decomposition, (d) transmission path encoding/decoding, (e) modulation (symbol mapping)/demodulation, and (f) OFDM symbol data (baseband OFDM signal) generation by Inverse Fast Fourier Transform (IFFT) and the like. On the other hand, the control plane processing includes communication management of Layer 1 (e.g., transmission power control), Layer 2 (e.g., radio resource management and hybrid automatic repeat request (HARQ) processing), and Layer 3 (e.g., attach, mobility, and signaling related to call management).

For example, in the case of LTE and LTE-Advanced, the digital baseband signal processing by the baseband processor 1103 may include signal processing of Packet Data Convergence Protocol (PDCP) layer, Radio Link Control (RLC) layer, MAC layer, and PHY layer. Further, the control plane processing by the baseband processor 1103 may include processing of Non-Access Stratum (NAS) protocol, RRC protocol, and MAC CE.

The baseband processor 1103 may include a modem processor (e.g., Digital Signal Processor (DSP)) that performs digital baseband signal processing and a protocol stack processor (e.g., Central Processing Unit (CPU) or Micro Processing Unit (MPU)) that performs control plane processing. In this case, the protocol stack processor that performs control plane processing may be made common to an application processor 1104, which is described below.

The application processor 1104 is also called a CPU, an MPU, a microprocessor or a processor core. The application processor 1104 may include a plurality of processors (a plurality of processor cores). The application processor 1104 implements each function of the UE 90 and the UE 95 by running a system software program (Operating System (OS)) and various application programs (e.g., call application, web browser, mailer, camera control application, music playback application etc.) read from a memory 1106 or a memory, which is not shown.

In several implementations, as shown in the dotted line (1105) in FIG. 24, the baseband processor 1103 and the application processor 1104 may be integrated into one chip. In other words, the baseband processor 1103 and the application processor 1104 may be implemented as one System on Chip (SoC) device 1105. The SoC device is also called a system Large Scale Integration (LSI) or a chip set in some cases.

The memory 1106 is a volatile memory, a nonvolatile memory, or a combination of them. The memory 1106 may include a plurality of memory devices that are physically independent of one another. The volatile memory is a Static Random Access Memory (SRAM), a Dynamic RAM (DRAM), or a combination of them, for example. The nonvolatile memory is a mask Read Only Memory (MROM), an Electrically Erasable Programmable ROM (EEPROM), a flash memory, a hard disk drive, or a combination of them, for example. For example, the memory 1106 may include an external memory device that is accessible from the baseband processor 1103, the application processor 1104 and the SoC 1105. The memory 1106 may include an internal memory device that is integrated into the baseband processor 1103, the application processor 1104 or the SoC 1105. Further, the memory 1106 may include a memory in a Universal Integrated Circuit Card (UICC).

The memory 1106 may store a software module (computer program) containing a group of instructions and data for performing the processing by the UE 90 and the UE 95 described in the above plurality of embodiments. In several implementations, the baseband processor 1103 or the application processor 1104 may be configured to perform the processing of the UE 90 and the UE 95 described in the above embodiments by reading the software module from the memory 1106 and executing it.

Figure 15:
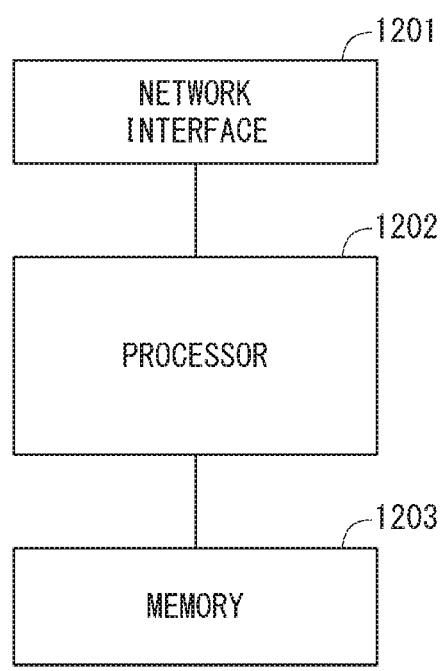
FIG. 15 is a diagram showing a configuration of the AuC and the HSS according to each embodiment.

FIG. 15 is a block diagram showing a configuration example of the AuC 40, the AuC 50, the AuC 51, the AuC 52, the AuC 60, the AuC 61, the AuC 62, the HSS 30, the HSS 35, and the HSS 36 (hereinafter, referred to as the AuC 40 and the like). Referring to FIG. 15, the AuC 40 and the like includes a network interface 1211, a processor 1202, and a memory 1203. The network interface 1201 is used to communicate with network nodes (e.g., the radio communication device 21). The network interface 1201 may include a network interface card (NIC) that complies with the IEEE 802.3 series, for example.

The processor 1202 reads and runs software (computer program) from the memory 1203 and thereby executes processing of the AuC 40 and the like that is described with reference to the sequence charts and the flowcharts in the embodiments described above. The processor 1202 may be a microprocessor, an MPU or a CPU, for example. The processor 1202 may include a plurality of processors.

The memory 1203 is a combination of a volatile memory and a nonvolatile memory. The memory 1203 may include a storage that is placed apart from the processor 1202. In this case, the processor 1202 may access the memory 1203 through an I/O interface, which is not shown.

In the example of FIG. 15, the memory 1203 is used to store a group of software modules. The processor 1202 reads and runs the group of software modules from the memory 1203 and can thereby perform the processing of the AuC 40 and the like described in the above embodiments.

As described with reference to FIGS. 14 and 15, each of processors included in the UE 90, the UE 95, the AuC 40, the AuC 50, the AuC 51, the AuC 52, the AuC 60, the AuC 61, the AuC 62, the HSS 30, the HSS 35 and the HSS 36 runs one or a plurality of programs including a group of instructions for causing a computer to perform the algorithms described using the drawings. The program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, DVD-ROM (Digital Versatile Disc Read Only Memory), DVD-R (DVD Recordable)), DVD-R DL (DVD-R Dual Layer)), DVD-RW (DVD ReWritable)), DVD-RAM), DVD+R), DVR+R DL), DVD+RW), BD-R (Blu-ray (registered trademark) Disc Recordable)), BD-RE (Blu-ray (registered trademark) Disc Rewritable)), BD-ROM), and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

It should be noted that the present invention is not limited to the above-described embodiments and may be varied in many ways within the scope of the present invention. Further, in this disclosure, embodiments can be combined as appropriate.

While the disclosure has been particularly shown and described with reference to embodiments thereof, the disclosure is not limited to these embodiments. It will be understood by those of ordinary skill in the art that various changes in form and details may be made therein without departing from the spirit and scope of the present disclosure as defined by the claims.

This application is based upon and claims the benefit of priority from Japanese patent application No. 2016-140760 filed on Jul. 15, 2016, the disclosure of which is incorporated herein in its entirety by reference.

REFERENCE SIGNS LIST

10 Subscriber-information management apparatus
20 Security apparatus
30 HSS
31 Communication unit
32 Information management unit
35 HSS
36 HSS
40 AuC
41 Communication unit
42 Security-information management unit
43 NS-key generation unit
50 AuC
51 AuC
52 AuC
60 AuC
61 AuC
62 AuC
70 CPF
71 CPF
72 DEA
73 CPF
74 DEA
80 5G RAN
81 5G RAN
82 5G RAN
90 UE
91 Communication unit
92 NS-key generation unit
95 UE
100 Core network
101 HPLMN
102 VPLMN
110 NS system
111 NS system
112 NS system
120 NS system
121 NS system
122 NS system
130 NS system

The invention claimed is:

1. A communication method for a communication system including a control plane apparatus, a plurality of network slice systems, and an authentication apparatus, the communication method comprising:
receiving, by the control plane apparatus, a first message from a communication terminal, wherein the first message includes an identity of the communication terminal and information on the plurality of network slice systems;
authenticating, by the control plane apparatus and the authentication apparatus, the communication terminal for information on each of the plurality of network slice systems associated with the identity of the communication terminal; and
sending, by the control plane apparatus, a second message to the communication terminal, wherein the second message includes whether the authentication has succeeded or not,
wherein in a case where the authentication has failed, the control plane apparatus sends a cause value on the failure of the authentication to the communication terminal.

2. A communication method for a communication terminal that communicates with a communication system including a control plane apparatus and a plurality of network slice systems, the communication method comprising:
sending a first message including an identity of the communication terminal and information on the plurality of network slice systems to the control plane apparatus;
receiving a second message including whether authentication of the communication terminal has succeeded or not for information on each of the plurality of network slice systems associated with the identity of the communication terminal from the control plane apparatus; and
in a case where the authentication has failed, receiving a cause value on the failure of the authentication from the control plane apparatus.

3. A communication method for a control plane apparatus used in a communication system, the communication method comprising:
receiving a first message including an identity of a communication terminal and information on a plurality of network slice systems from the communication terminal;
authenticating the communication terminal for information on each of the plurality of network slice systems associated with the identity of the communication terminal;
sending a second message including whether the authentication has succeeded or not to the communication terminal; and
in a case where the authentication has failed, sending a cause value on the failure of the authentication to the communication terminal.

* * * * *